United States Patent [19]

Ra et al.

[11] Patent Number: 5,322,488
[45] Date of Patent: Jun. 21, 1994

[54] CONTINUOUSLY GEARED AUTOMATIC TRANSMISSION WITH CONTROLLING BRAKES

[75] Inventors: Jong O. Ra, Dong, Yangsan-Gu, Seoul; Joon Y. Lim, Duckyong Villa Ka-204 141-2, Duckjeong-Ri, Hoecheon-Uep, Yangju-Gun, Kyungki-Do; Wan M. Yoo, Incheon, all of Rep. of Korea

[73] Assignees: Jong O. Ra; Joon Y. Lim, both of Rep. of Korea

[21] Appl. No.: 920,892

[22] Filed: Jul. 28, 1992

[30] Foreign Application Priority Data

Jul. 29, 1991 [KR] Rep. of Korea .................. 91-12993

[51] Int. Cl.⁵ .............................................. F16H 37/06
[52] U.S. Cl. .................................. 475/330; 475/150; 475/317
[58] Field of Search .................. 475/1, 2, 150, 280, 475/311, 317, 330

[56] References Cited

U.S. PATENT DOCUMENTS

| 4,010,653 | 3/1977 | Mekjian | 475/311 O |
| 4,027,552 | 6/1977 | Murakami et al. | 475/280 X |
| 5,062,823 | 11/1991 | Ra et al. | 475/330 |
| 5,141,477 | 8/1992 | Oshidari | 475/280 X |

FOREIGN PATENT DOCUMENTS 1415523 11/1975 United Kingdom .
2160598 12/1985 United Kingdom .

OTHER PUBLICATIONS

U.S. Patent App. #08/028,824 to Jong-Oh Ra et al. filed Jan. 22, 1993.

*Primary Examiner*—Leslie A. Braun
*Assistant Examiner*—Daniel Wittels
*Attorney, Agent, or Firm*—Merchant, Gould, Smith, Edell, Welter & Schmidt

[57] ABSTRACT

A transmission having an input shaft with a sun gear (12), a medium speed shaft with a sun gear (14) rotatably mounted on the input shaft, a low speed shaft with a sun gear (16) rotatable mounted on the medium speed shaft and a reverse rotation shaft with a sun gear (18) rotatable mounted on the low speed shaft. A first carrier and a second carrier terminating in an output shaft are rotatably mounted on the reverse shaft and input shaft, respectively. Locking pins interconnect first and second carriers. Reverse rotation gear is integrally formed with an input gear and rotatable mounted on a locking pin. Each reverse rotation gear meshes with the reverse sun gear (18) and each input gear meshes with sun gear (12). Low speed gears are integrally formed with a medium speed gear and rotatable mounted on a locking pin. Each low speed gear meshes with sun gear (16) and each medium speed gear meshes with the input gear and the sun gear (14). Low speed brake (41) brakes the low speed shaft to provide a low speed rotation of the output shaft. Medium speed brake (42) brakes the medium speed shaft to provide a medium speed rotation of the output shaft. Interlocking system (50) directly couples the input shaft and the medium speed shaft to provide high speed rotation of the output shaft. Reverse rotation brake (43) brakes the reverse rotation shaft to provide reverse rotation of the output shaft.

14 Claims, 14 Drawing Sheets

CONTINUOUSLY GEARED AUTOMATIC TRANSMISSION WITH CONTROLLING BRAKES

BACKGROUND OF INVENTION

1. Field of the Invention

The invention relates to a transmission, and more particularly to an automatic transmission which obviates the need for a clutch means to change gears and provides rotational output to an output shaft without disengaging gears when decelerating or accelerating or when reversing rotational output of the output shaft to obtain a backward motion.

2. Information Disclosure Statement

Generally to change speed using a manual transmission a predetermined gear ratio is selected for each speed range. Careful attention is necessary in this process since the gears must be shifted (changed or disengaged) when changing speed. Such transmissions are complicated and require a large installation space because the manual clutch must be installed in addition to the transmission.

To solve the above problems U.S. Pat. No. 5,062,823 entitled: Continuously Variable Transmission with Controlling Brakes, issued on Nov. 5, 1991. However, the transmission described in the above patent document requires a separate means for attaining reverse operation, i.e. a backward motion.

Therefore, an object of the present invention is to provide a continuous automatic transmission which advances the state of the art, which can rapidly comply with a change of the load without using a clutch or other complicated mechanisms, which smoothly transmits rotational force to an output shaft, which facilitates a smooth reverse motion, and which is of simple construction.

The preceding objects should be construed as merely presenting the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The automatically variable transmission of the present invention is defined by the claims with a specific embodiment shown in the attached drawings. For the purpose of summarizing the invention, the invention relates to an automatic variable speed transmission which comprises an input shaft 11 with a first section 11A and a second section 11B for receiving rotational input and further including an input sun gear 12 secured to the input shaft to enable simultaneous rotation with the input shaft. A medium speed control shaft 13 is rotatably and coaxially mounted on the input shaft 11 to enable independent rotation about the input shaft and further including a medium speed sun gear 14 secured to the medium speed control shaft 13 to enable simultaneous rotation with the medium speed control shaft 13. A low speed control shaft 15 is rotatably and coaxially mounted relative to the medium speed control shaft 13 to enable independent rotation about the medium speed control shaft 13 and the low speed shaft 15 further including a low speed sun gear 16 secured to the low speed control shaft 15 to enable simultaneous rotation with the low speed control shaft 15. A reverse rotation control shaft 17 is rotatably and coaxially mounted relative to the medium speed control shaft 13 to enable independent rotation about the medium speed control shaft 13 and the reverse rotation control shaft 17 further including a reverse rotation sun gear 18 secured to the reverse rotation control shaft 17 to enable simultaneous rotation with the reverse rotation control shaft 17. The placement of the low speed control shaft 15 and the reverse rotation control shaft 17 relative to the input shaft 11 is not critical. That is, either the low speed control shaft 15 or the reverse rotation control shaft 17 can be first rotatably and coaxially mounted on the medium speed control shaft 13 with the remaining shaft rotatably and coaxially mounted thereon. The resulting arrangement of the gears related to the low speed control shaft 15 and the reverse rotation control shaft 17 is directed by the mounting position of the respective shafts. A first carrier 21 is rotatably and coaxially mounted on one of the reverse rotation control shaft 17 or the low speed control shaft 15 to enable independent rotation about one of the reverse rotation control shaft 17 or the low speed control shaft 15, respectively. A second carrier 23 is rotatably and coaxially mounted on the second section 11B of the input shaft 11 to enable independent rotation about the input shaft 11 and with the second carrier 23 terminating in an output shaft 24. A plurality of locking pins 25, 26 with each locking pin of the plurality of locking pins 25, 26 secured to and interconnecting the first and second carriers 21, 23 to enable simultaneous rotation of the first carrier 21 about one of the reverse rotation control shaft 17 or the low speed control shaft 15, respectively, and the second carrier 23 about the input shaft 11. A plurality of input differential gears 31 are used with each input differential gear 31A of the plurality of input differential gears 31 in mechanical communication with the input sun gear 12. A plurality of reverse rotation differential gears 32 are used with each reverse rotation differential gear 32A interconnected to an input differential gear 31A of the plurality of input differential gears 31 and with the interconnected reverse rotation differential gear 32A and the input differential gear 31A rotatably mounted on a locking pin 25A of the plurality of locking pins 25. This enables simultaneous rotation about the locking pin 25A. Each reverse rotation differential gear 32A is in mechanical communication with the reverse rotation sun gear 18. A plurality of medium speed differential gears 35 are used with each medium speed differential gear 35A in mechanical communication with the input differential gear 31A and the medium speed sun gear 14. A plurality of low speed differential gears 36 are used with each low speed differential gear 36A rotatably mounted on a locking pin 26A and with each low speed differential gear 36A and medium speed differential gear 35A being interconnected to enable simultaneous rotation about the locking pin 26A, with each low speed differential gear in mechanical communication with the low speed sun gear 16. A low speed brake means 41 is used for applying rotational braking force to the low speed control shaft 15 thereby providing a low rotational speed of the output shaft relative to the rotational speed of the input shaft. A medium speed brake means 42 is used for applying rotational braking force to the medium speed control shaft 13 thereby providing medium rotational speed of the output shaft relative to the rotational speed of the input shaft. An interlocking means 50 is used for directly coupling the rotational speed of the input shaft 11 and the rotational speed of the medium speed control shaft 13 to provide high rotational speed of the output shaft. A reverse rotation brake system 43 is used for applying rotational braking force to the reverse rotation control shaft 17 which enables reverse rotation of the output shaft relative to the input shaft.

In one embodiment of the automatic variable speed transmission of the present invention the low speed control shaft 15 is rotatably and coaxially mounted on the medium speed control shaft 13 to enable independent rotation about the medium speed control shaft. The reverse rotation control shaft 17 is then rotatably and coaxially mounted on the low speed control shaft 15 to enable independent rotation about the low speed control shaft. In this case the first carrier 21 is then rotatably and coaxially mounted on the reverse rotation control shaft 17 to enable independent rotation about the reverse rotation control shaft 17.

In another embodiment of the automatic variable speed transmission of the present invention the reverse rotation control shaft 17 is rotatably and coaxially mounted on the medium speed control shaft 13 to enable independent rotation about the medium speed control shaft. The low speed control shaft 15 is then rotatably and coaxially mounted on the reverse rotation control shaft 17 to enable independent rotation about the reverse rotation control shaft. In this case, the first carrier 21 is rotatably and coaxially mounted on the low speed control shaft 15 to enable independent rotation about the low speed control shaft 15.

Another embodiment of the automatic variable speed transmission comprises an input shaft 11 with a first section 11A and a second section 11B for receiving rotational input and further including an input sun gear 12 secured to the input shaft to enable simultaneous rotation with the input shaft. A low speed control shaft 15 is rotatably and coaxially mounted relative to the input shaft 11 to enable independent rotation about the input shaft 11 and the shaft 15 further including a low speed sun gear 16 secured thereto to enable simultaneous rotation with the low speed control shaft 15. A reverse rotation control shaft 17 is rotatably and coaxially mounted relative to the input shaft 11 to enable independent rotation about the input shaft 11 and the shaft 17 further including a reverse rotation sun gear 18 secured thereto to enable simultaneous rotation with the reverse rotation control shaft 17. As discussed above, the coaxial placement of the low speed control shaft 1 and the reverse rotation control shaft 17 relative to the input shaft 11 is not critical. A first carrier 21 is rotatably and coaxially mounted on one of the reverse rotation control shaft 17 or the low speed control shaft 15 to enable independent rotation about one of the reverse rotation control shaft 17 or the low speed control shaft 15, respectively. That is, either the low speed control shaft 15 or the reverse rotation control shaft 17 may be coaxially positioned on the input shaft with the remaining shaft (15 or 17) coaxially receiving the first carrier 21. A second carrier 23 is rotatably and coaxially mounted on the second section 11B of the input shaft 11 to enable independent rotation about the input shaft 11 and with the second carrier 23 terminating in an output shaft 24. A plurality of locking pins 25, 26 are used with each locking pin of the plurality of locking pins 25, 26 secured to and interconnecting the first and second carriers 21, 23 to enable simultaneous rotation of the first carrier 21 about one of the reverse rotation control shaft 17 or the low speed control shaft 15, respectively, and the second carrier 23 about the input shaft 11. A plurality of input differential gears 31 are used with each input differential gear 31A of the plurality of input differential gears 31 in mechanical communication with the input sun gear 12. A plurality of reverse rotation differential gears 32 with each reverse rotation differential gear 32A interconnected to an input differential gear 31A of the plurality of input differential gears 31 and with the interconnected reverse rotation differential gear 32A and the input differential gear 31A rotatably mounted on a locking pin 25A of the plurality of locking pins 25 to enable simultaneous rotation about the locking pin 25A and each the reverse rotation differential gear 32A in mechanical communication with the reverse rotation sun gear 18. A plurality of medium speed differential gears 35 are used with each medium speed differential gear 35A in mechanical communication with the input differential gear 31A. A plurality of low speed differential gears 36 are used with each low speed differential gear 36A rotatably mounted on a locking pin 26A and with each low speed differential gear 36A and the medium speed differential gear 35A being interconnected to enable simultaneous rotation about the locking pin 26A and each low speed differential gear being in mechanical communication with the low speed sun gear 16. A low speed brake means 41 is used for applying rotational braking force to the low speed control shaft 15 to provide a low speed rotation of the output shaft. An interlocking means 50' is used for directly coupling the rotation of the input shaft 11 and the rotation of one of the low speed control shaft 15 or the reverse rotation control shaft 17 to provide medium and high speed rotation of the output shaft. A reverse rotation brake means 43 is used for applying rotational braking force to the reverse rotation control shaft 17 to provide reverse rotation of the output shaft.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 1 is a partial perspective view of the first embodiment;

FIG. 2 is an assembled sectional view of the first embodiment of the present invention;

FIG. 3 is a sectional view showing the continuous automatic transmission according to the present invention in the neutral state;

FIG. 4 is a sectional view showing the continuous automatic transmission according to the present invention in the forward low speed state;

FIG. 5 is a sectional view showing the continuous automatic transmission according to the present invention in the forward medium speed state;

FIG. 6 is a sectional view showing the continuous automatic transmission according to the present invention in the forward high speed state;

FIG. 7 is a sectional view showing the continuous automatic transmission according to the present invention in the reverse driving state;

FIG. 8 is an assembled sectional view of another embodiment according to the present invention;

FIG. 9 is a sectional view showing the neutral state;

FIG. 10 is a sectional view showing the forward low speed state;

FIG. 11 is a sectional view showing the high speed state;

FIG. 12 is a sectional view showing the reverse driving state;

Similar reference characters refer to similar parts throughout the several views of the drawings.

DETAILED DESCRIPTION OF THE INVENTION

Figure 1:
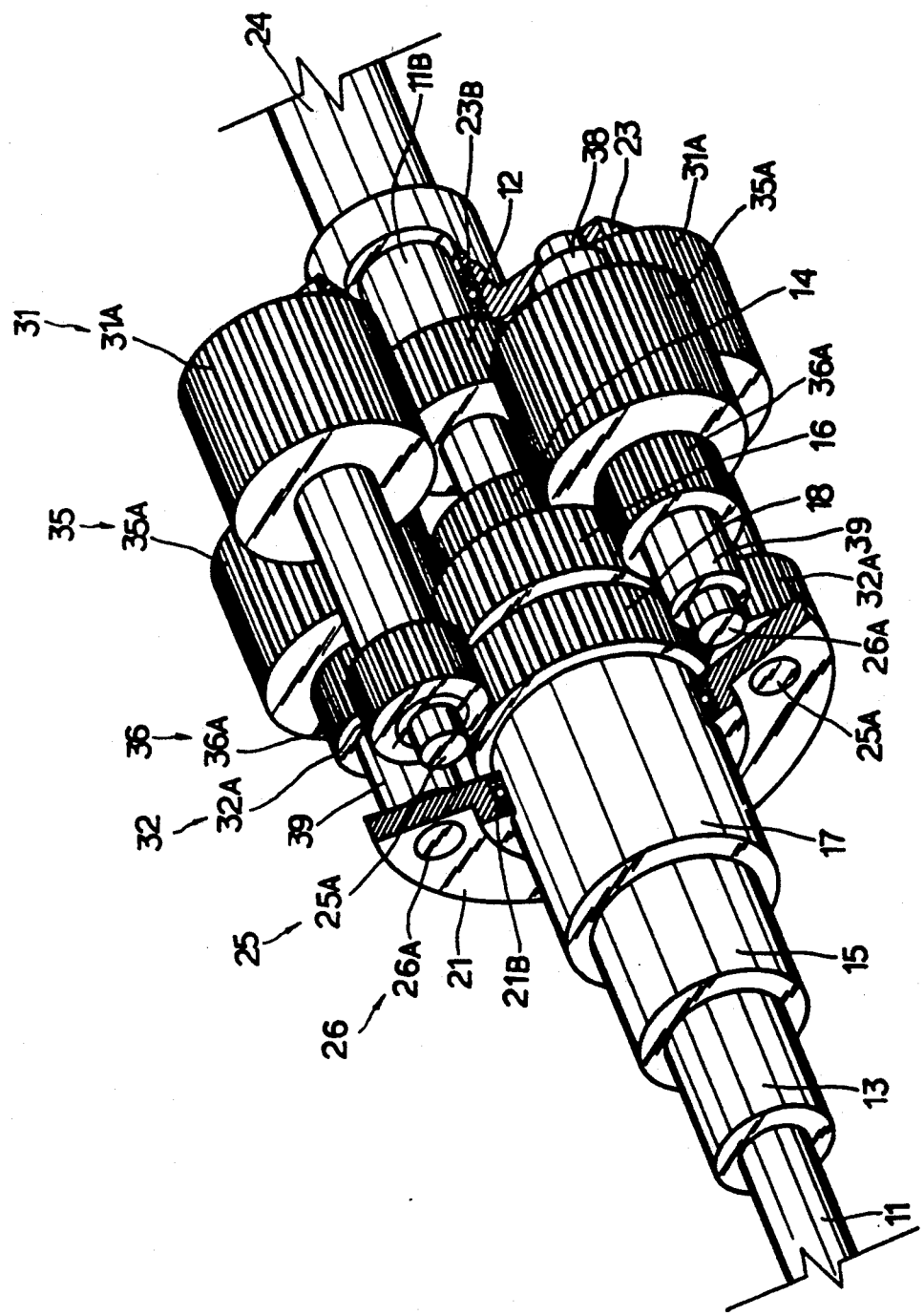
FIGS. 1–7 illustrate the first embodiment of the continuous automatic transmission according to the present invention.
Figure 2:
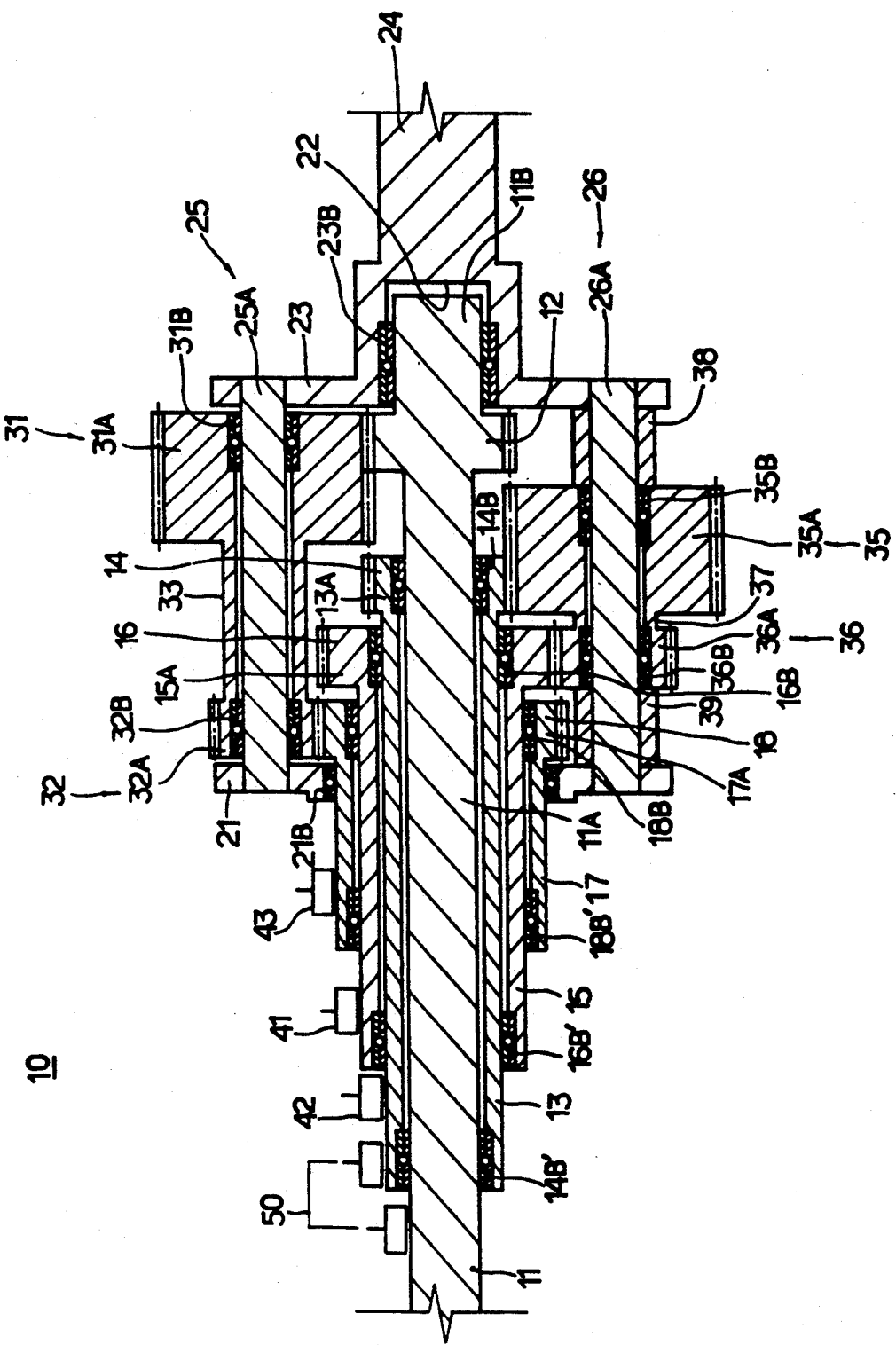

The continuous automatic transmission 10 of the first embodiment of the present invention, as shown in FIGS. 1 and 2, includes the input shaft 11 to which a driving force is input from the drive shaft of an engine. The input shaft 11 consists of the first section 11A and the second section 11B. The input sun gear 12 is integrally formed with the input shaft 11 between the first section 11A and the second section 11B. The medium speed control shaft 13 of a predetermined length is coaxially installed at the first section 11A of the input shaft 11. The medium speed sun gear 14 is integrally formed at the end 13A of the medium speed control shaft 13. Bearings 14B, 14B' are installed such that the input shaft 11 and the medium speed control shaft 13 rotate independently.

The low speed control shaft 15 of predetermined length is coaxially installed on the medium speed control shaft 13. The low speed sun gear 16 is integrally formed at end 15A of the low speed control shaft 15. Bearings 16B, 16B' are installed such that the medium speed control shaft 13 and the low speed control shaft 15 rotate independently. In like manner, the reverse rotation control shaft 17 of predetermined length is coaxially installed on the low speed control shaft 15. The reverse rotation sun gear 18 is integrally formed at the end 17A of the reverse rotation control shaft 17.

Bearings 18B, 18B' are installed such that the low speed control shaft 15 and the reverse rotation control shaft 17 rotate independently.

The disk type first carrier 21 is installed on the reverse rotation control shaft 17 near the reverse rotation sun gear 18 so as to rotate freely via a bearing 21B. A second carrier 23 with a cavity 22 formed therein is integrally formed with an output shaft 24. The second section 11B of the input shaft is received into the cavity 22 so as to rotate freely via a bearing 23B.

The plurality of locking pins 25, 26 interconnect and are secured to each of the first and second carriers 21, 23 so that the carriers 21, 23 rotate together about the input shaft 11 (See FIG. 1). The input differential gear 31A and the reverse rotation differential gear 32A are joined or interconnected by sleeve 33 to enable simultaneous rotation about locking pin 25A. Thus, the input differential gear 31A and the reverse rotation differential gear 32A are spaced apart by the length of the sleeve 33 as is shown in the figures. This composite structure comprises the differential gears 31A, 32A rotatably mounted onto a locking pin 25A so as to rotate freely via bearings 31B, 32B.

A sleeve 37 of a predetermined length is formed between the medium speed differential gear 35A and the low speed differential gear 36A which are integrally formed each other and which have a different size. The medium speed differential gear 35A and the low speed differential gear 36A are joined or interconnected by sleeve 37 to enable simultaneous rotation about locking pin 26A. Thus, the medium speed differential gear 35A and the low speed differential gear 36A are spaced apart by the length of the sleeve 37 as is shown in the figures. This composite structure comprises differential gears 35A, 36A rotatably mounted onto a locking pin 26A so as to rotate freely via bearings 35B, 36B. Each low speed differential gear 36A meshes with the low speed sun gear 16, and each medium speed differential gear 35A meshes with the medium speed sun gear 14 and each input differential gear 31A. Bushings 38, 39 may be inserted to prevent the axial movement of the medium speed and low speed differential gears along the locking pins 26.

Three "first" sets are used for the safety of the rotating body with a set consisting of a locking pin 25A, an input differential gear 31A, a reverse rotation differential gear 32A and bearings 31B, 32B. In like manner, three "second" sets are used for the safety of the rotating body with each set consisting of a locking pin 26A, a medium speed differential gear 35A, a low speed differential gear 36A, bearings 35B, 36B and bushings 38, 39. However, the number of such sets is not limited.

Reviewing the meshed state of each gear, the inner side of the rear half of each input differential gear 31A meshes with input sun gear 12, and the forward half thereof meshes with the rear half of each medium speed differential gear 35A. The inner side of the forward half of each medium speed differential gear 35A meshes with the medium speed sun gear 14, the inner side of each reverse rotation differential gear 32A meshes with the reverse rotation sun gear 18, and the inner side of each low speed differential gear 36A meshes with the low speed sun gear 16.

The brake means for applying a rotational braking force to each respective control shaft are used to effect a change in rotational speed of the output shaft speed relative to the input shaft 11 for each step. The low speed brake means 41 is installed on the low speed control shaft 15 to adjust the low speed sun gear 16 in the low speed state. The medium speed brake means 42 is installed on the medium speed control shaft 13 to adjust the medium speed sun gear 14 in the medium speed state. The reverse rotation brake means 43 is installed on the reverse rotation control shaft 17 to adjust the reverse rotation sun gear 18 in the reverse driving state.

Although the brake means as illustrated are installed on the control shaft, the positions for installation of the brake means and the constructions thereof can be changed. Furthermore, the above described the low speed, medium speed and reverse rotation brake means can use either automatic control or manual control. A friction brake system which frictionally engages the shaft can be used. However, other brake means are well known in the art and would be expected to accomplish the purpose of the brake in the present invention. Thus, the brake system may be electric, electronic, hydraulic or friction wheel and the like.

In the high speed state, the input shaft 11 and the medium speed control shaft 13 are rotated together by an interlocking means 50 which locks the shafts together. Such interlocking means is not only able to cause the input shaft and the medium speed control shaft to rotate at the same speed, but also can cause a difference in their respective speeds of rotation. Such means are known and include a hydraulic clutch, torque converter, electric electronic clutch and the like. A detailed description about such known devices is omitted for sake of brevity. Besides the interlocking of the input shaft 11 and the medium speed control shaft 13, the other control shafts can also be interlocked in the high speed mode.

The power transmission procedure and speed variation conditions of the continuous automatic transmission constructed as such are described below with the speed variation conditions classified into a neutral, low speed, medium speed, high speed and reverse driving states.

The continuous automatic transmission of the present invention can be used in any mechanism which converts rotational driving power of engine, such as the type used in an automobile and industrial machines, however the following description is based on an automobile.

For the convenience of explanation, the direction of the input shaft when viewed from the left side of the drawings is counter-clockwise, and such a direction is defined as direction "↑" in the drawings.

1. Neutral State (FIG. 3)

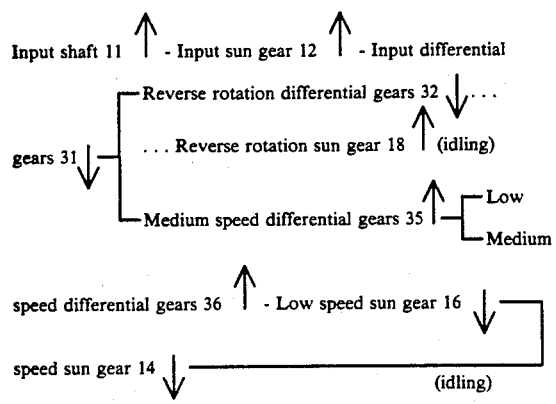

Figure 3:
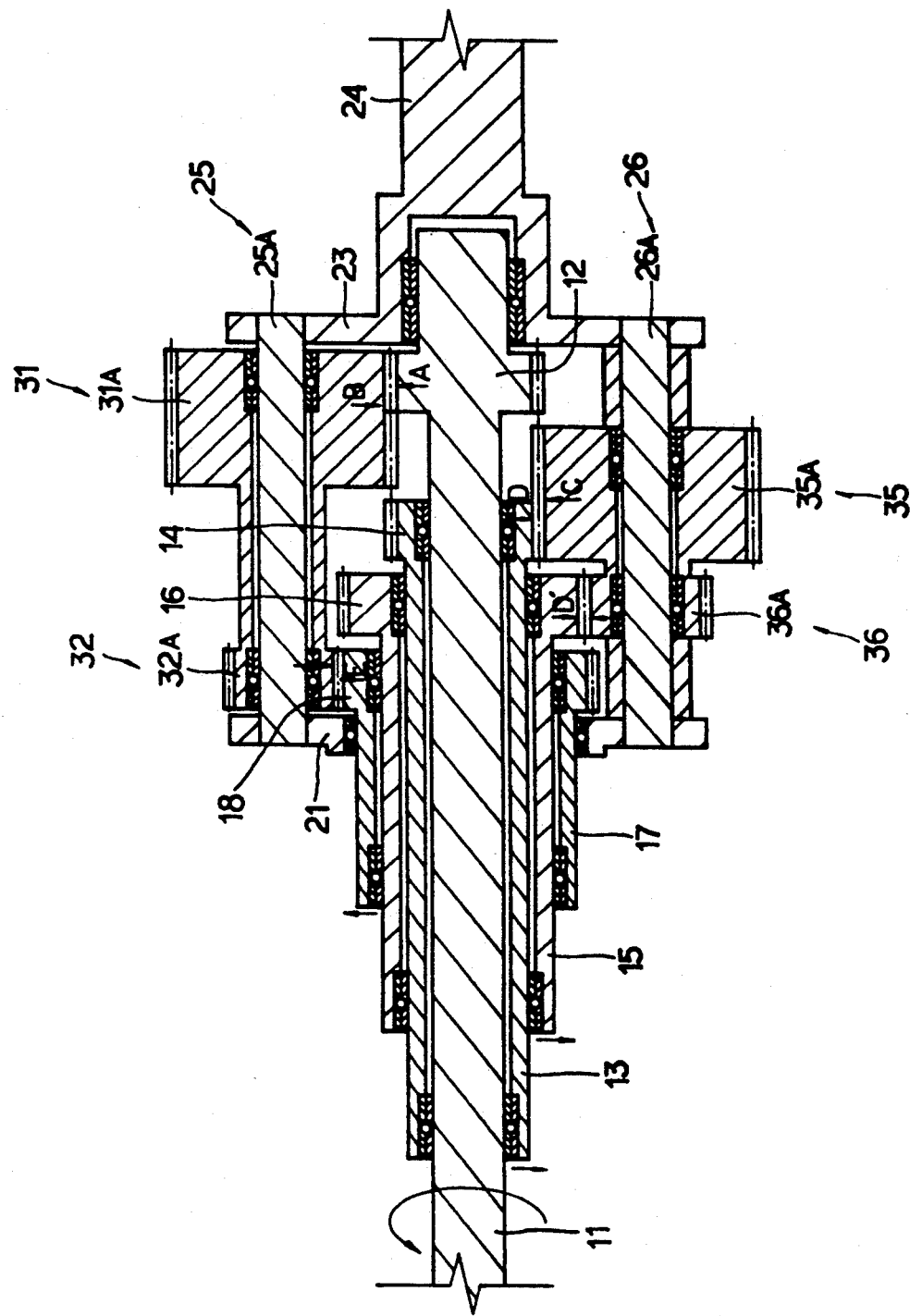

The neutral state is a state in which the driving force of the engine is not output to the output shaft 24 and the transmission idles as shown in FIG. 3. That is, if the rotational force from the driving shaft of the engine is input in the state in which a load is applied on the output shaft 24, then the input shaft 11 rotates and the input sun gear 12 integrally formed on the input shaft 12 rotates in a direction A. According to the rotation of the input sun gear 12, the input differential gear 31A and the reverse rotation differential gear 32A integrally formed with the input differential gear rotate about the locking pin 25A in a direction B opposite to the rotational direction of the input sun gear 12. The medium speed differential gear 35A meshed with the input differential gear 31A and the low speed differential gear 36A integrally formed with the medium speed differential gear rotate about the locking pin 26A in a direction C same as that of the input sun gear 12. The medium speed sun gear 14 meshed with the medium speed differential gear 35A which rotates in the direction C, and the low speed sun gear 16 meshed with the low speed differential gear 36A rotate in each direction D, D' opposite to the rotational direction of the medium speed differential gear 35A, the direction D, D' being opposite to the direction of the input sun gear 12. The reverse rotation sun gear 18 meshed with the reverse rotation differential gear 32A which rotates in the direction B rotates in a direction E which is opposite to the rotational direction of the reverse rotation differential gear.

In this neutral state, owing to the second carrier 23 integrally formed with the output shaft 24 which is stationary due to a load, all the differential gears only rotate about their own axis. The input driving force rotates the medium speed and low speed differential gears 14, 16 in respective direction D, D' which is opposite to that of the input sun gear, and rotates the reverse rotation sun gear 18 in the direction E which is the same as that of input shaft. Therefore, the driving force is not transmitted to the output shaft 24, that is, it is dissipated within the transmission.

Figure 4:
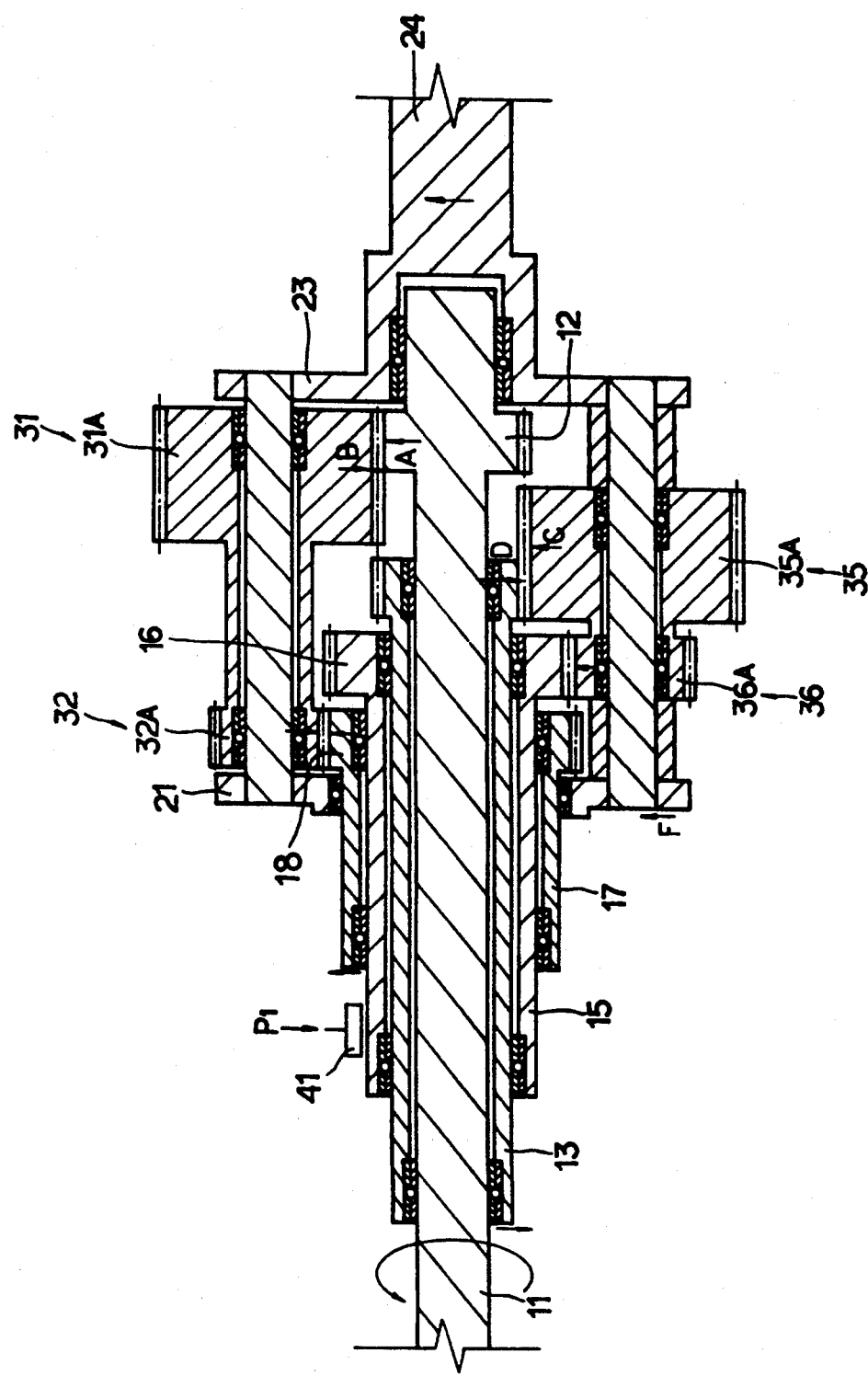

2. Low speed state (FIG. 4)

Input shaft 11 ↑ —input sun gear 12 ↑ —Input differential gears 31 ↓ —Medium speed differential gears 35 ↑ —Low speed differential gears 36 ↑ —Carriers 21, 23 ↑ —Output shaft 24 ↑

The low speed state is a state in which the rotation of the output shaft 24 is initiated and gradually increased from the natural state. In the above described neutral state, when the brake force Pl is applied by the low speed brake means 41 which is installed on the low speed control shaft 15, the rotational speed of the low speed sun gear 16, which was rotating in the direction D' opposite to the rotation of the input shaft, decreases and eventually stops, causing the initiation of the rotation of the output shaft 24 as the rotation of the low speed sun gear 16 decreases and stops.

Reviewing the transmission procedure of the power in this low speed state, the rotational force passed through the input shaft 11 and the input sun gear 12 rotates the input differential gear 31A in the direction B opposite to rotational direction A of the input sun gear 12, the medium speed differential gear 35A meshed with the input differential gear rotates in the direction C, and also the low speed differential gear 36A integrally formed with the medium speed differential gear 35A rotates in the direction C.

As the rotation of the low speed sun gear 16 decreases and stops by the brake force Pl, the low speed differential gear 36A revolves around the low speed sun gear 16 while, at the same time, rotating about its axis, the carriers 21, 23 rotate in a direction F and the output shaft 24 integrally formed with the second carrier 23, rotates.

Figure 5:
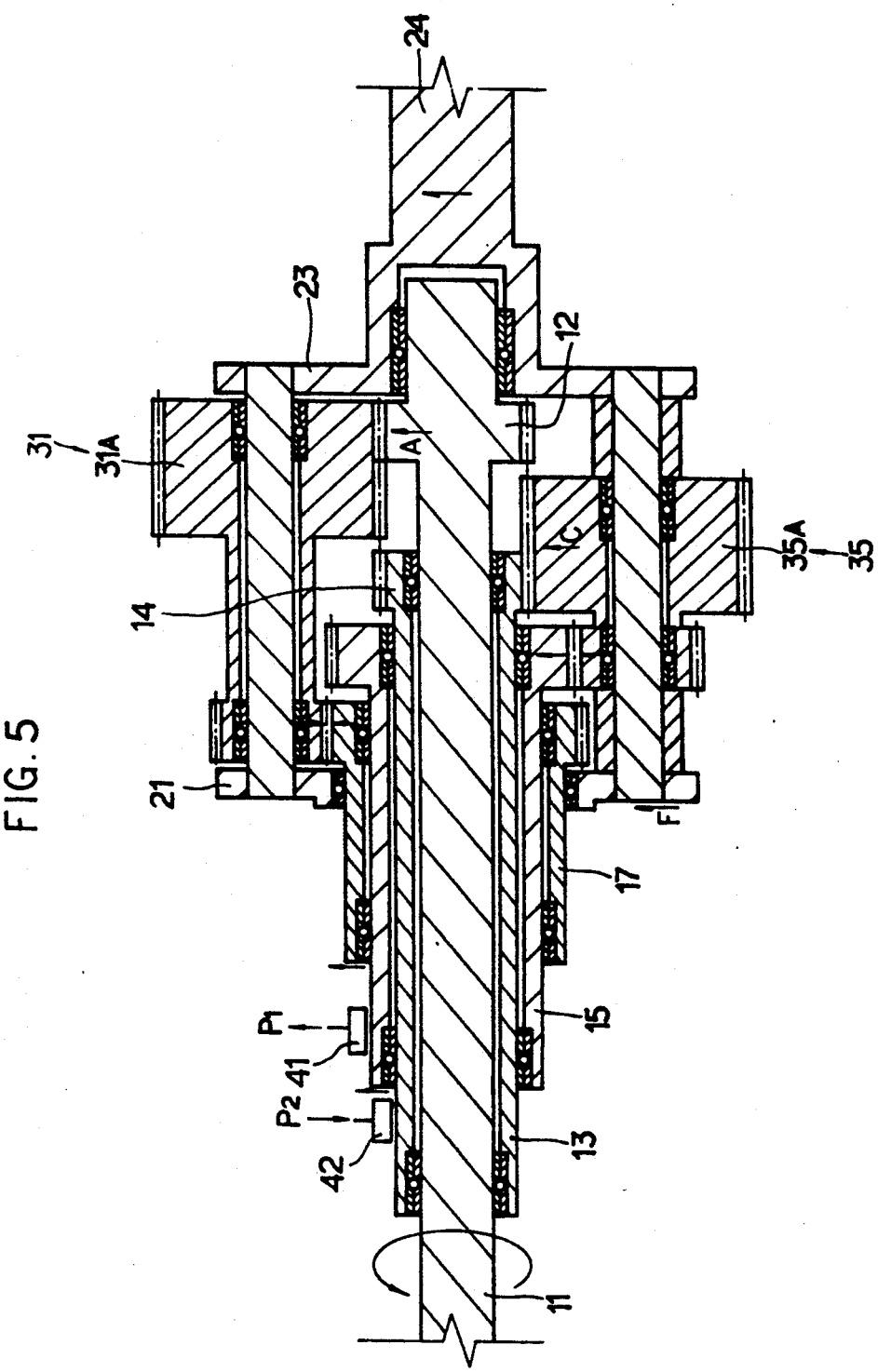

3. Medium speed state (FIG. 5)

Input shaft 11 ↑ —Input sun gear 12 ↑ —Input differential gears 31—Medium speed differential gears 35 ↑ —Carriers 21, 23 ↑ —Output shaft 24 ↑

The medium speed state increases the rotation of the output shaft 24 above the rotational speed of the low speed state. If in the low speed state, the brake force Pl applied to the low speed control shaft 15 is released and a brake force P2 is applied by the medium speed brake means 42 installed on the medium speed control shaft 13, the rotation of the medium speed sun gear 14, integrally formed on the medium speed control shaft 13 which was rotating in the direction D and which is opposite to that of the input shaft, decreases and stops. That is, as the rotation of the medium speed sun gear 14 decreases and stops, the rotation of the medium speed differential gears 35 about their axis decreases, and the medium speed differential gears 35 revolve around the medium speed sun gear 14 and increase the rotation of direction F of the first and second carriers 21, 23. Consequently, the rotation of the output shaft 24, integrally formed on the second carrier 23, increases.

Here, the rotation of the input differential gear 31A and the medium speed differential gears 35A about their own axis decreases due to the decrease and stop of the medium speed sun gear 14, and the revolution thereof, that is, co-rotation of each differential gears 31A, 35A with the carriers 21, 23 increases.

Figure 6:
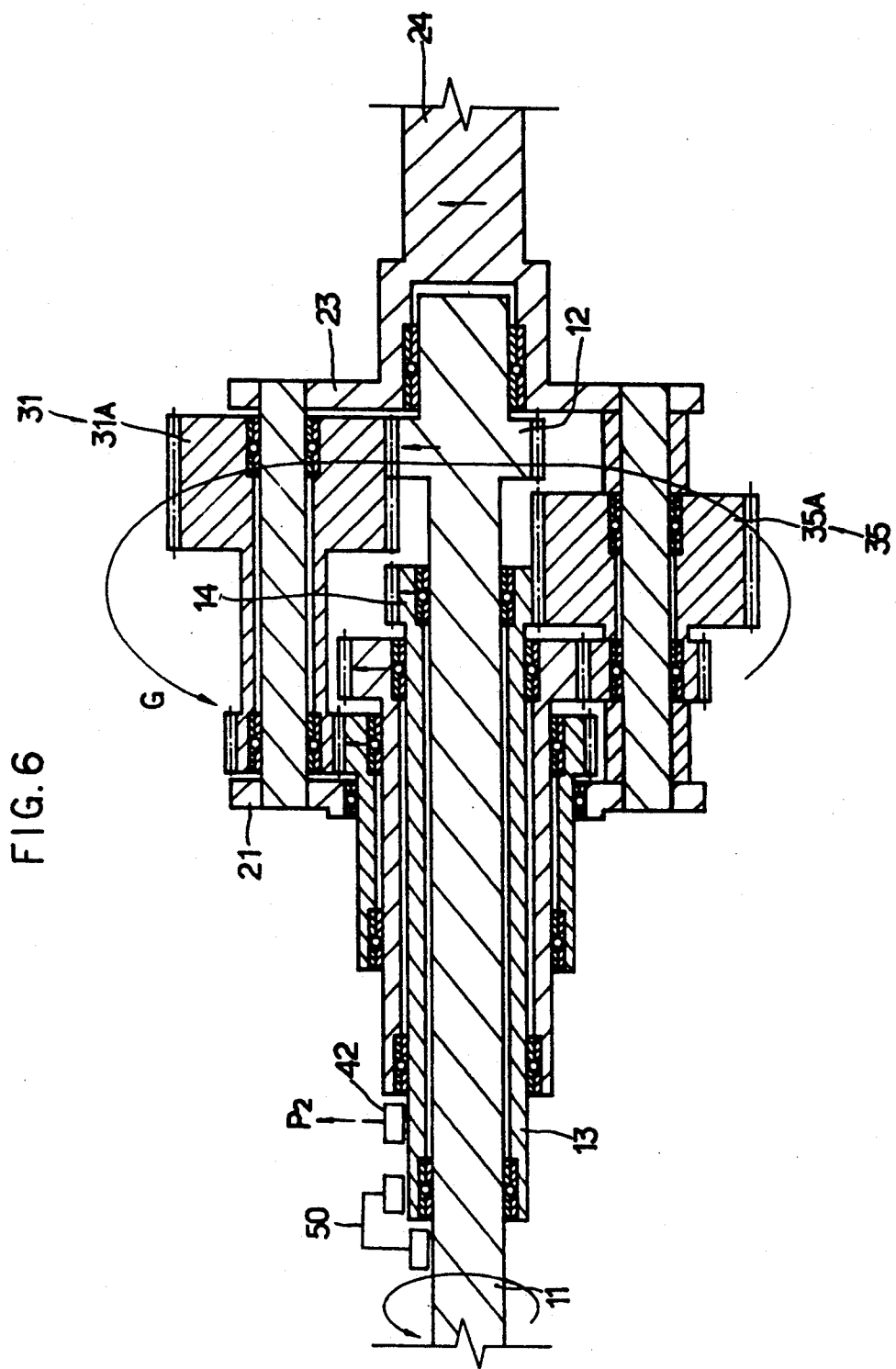

4. High speed state (FIG. 6)

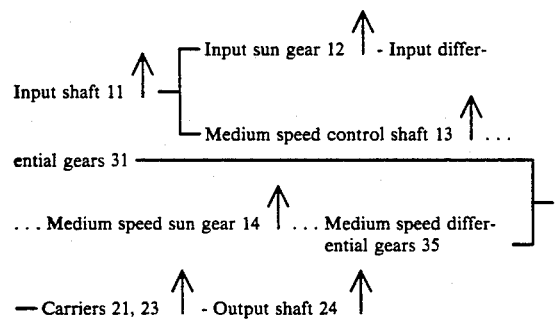

The high speed state further increases the rotational speed over the medium speed state. The brake force P2 applied to the medium speed control shaft 13 is released and the input shaft 12 and the medium speed control shaft 13 are locked together by the interlocking means 50 such that the rotational speed of the input shaft 11 and the medium speed control shaft 13 is the same.

In the high speed state, the rotational force passed through the input shaft 11 is transmitted along two paths. In the first, the rotational force is transmitted to the input sun gear 12 and the input differential gears 31 by passing through the input shaft 11 and rotating the input sun gear 12. In the second, the rotational force is transmitted to the medium speed sun gear 14 and the medium speed differential gears 35 by rotating the medium speed control shaft 13 integrally with the input shaft 11 and at the same time rotating the medium speed sun gear 14.

The rotational forces, after passing along these two paths, are combined at the first and second carriers 21, 23 to rotate the output shaft 24. That is, since the rotational speed input to the input sun gear 12 and the medium speed sun gear 14 is the same in speed and direction, they cannot rotate the input differential gears 31 and the medium speed differential gears 35 on their axis, but rotate the first and second carriers 21, 23 and the output shaft 24 in the same direction as the input shaft 11. In this state, all the gears and the first and second carriers 21, 23 constitute a single rotating body with the two sun gears 12, 14 as the centers to rotate in a direction G. At this time, the input differential gears 31 and the medium speed differential gears 35 rotate together with the first and second carriers 21, 23 and do not rotate about their own axis.

Figure 7:
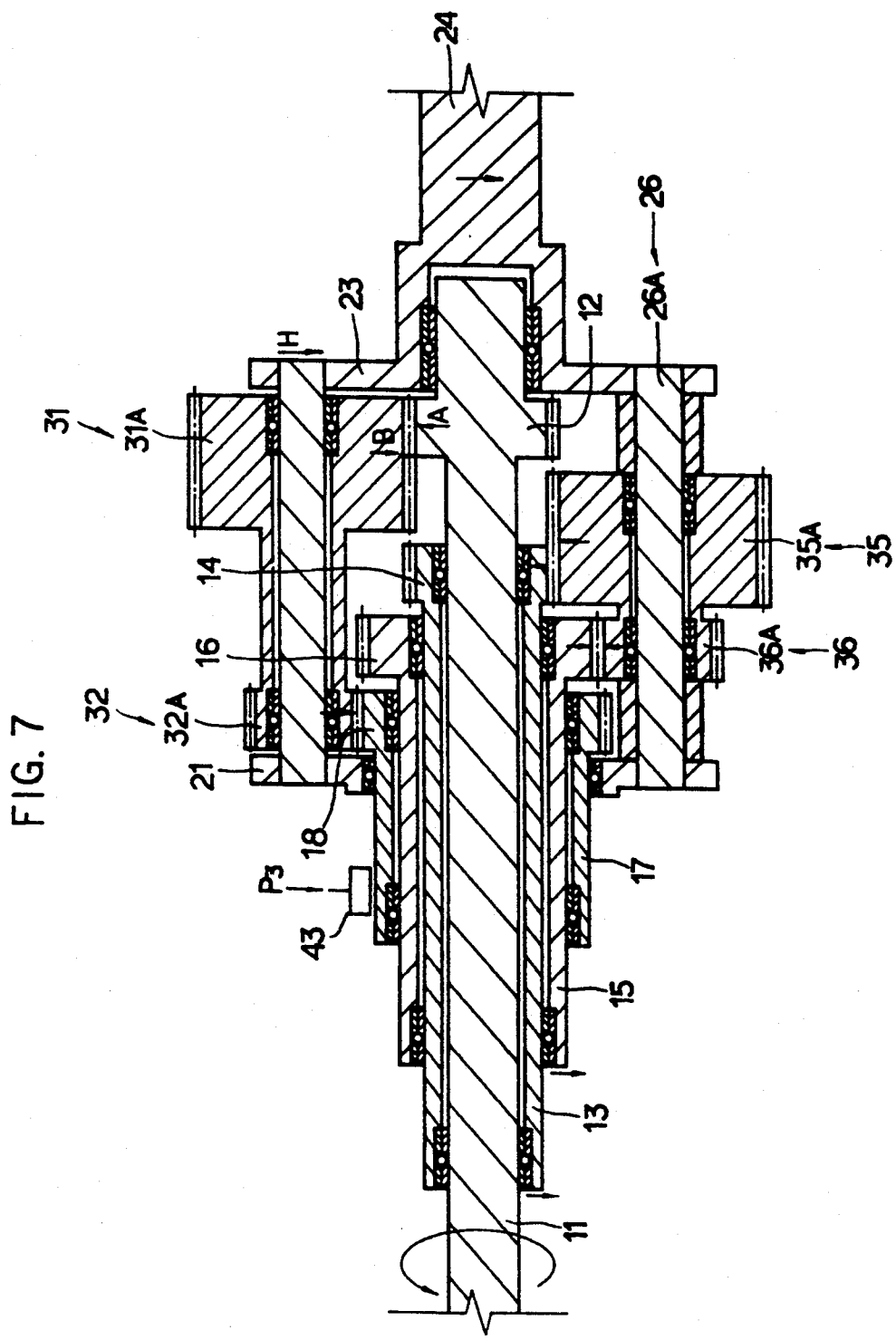

5. Reverse driving state (FIG. 7)

Input shaft 11 ↑ —Input sun gear 12 ↑ —Input differential gears 31 ↓ —Reverse rotation differential gears 32 ↓ —Carriers 21, 23 ↓ —Output shaft 24 ↓ (opposite to the direction of the input shaft)

The reverse driving state is a state in which the output shaft 24 rotates in a direction opposite to that of the input sun gear 12. If in the neutral state, a brake force P3 is applied by the reverse rotation brake means 43 installed on the reverse rotation control shaft 17, the reverse rotation sun gear 18 which was rotating in the direction E same as that of the input shaft 11 stops and the output shaft 24 rotates in a direction opposite to that of the input sun gear 12.

That is, the rotational force passed through the input shaft 11 and input sun gear 12 rotates the input differential gear 31A and the reverse rotation differential gear 32A in the direction B. The reverse rotation differential gear 32A rotates on its own axis and at the same time revolves around the reverse rotation sun gear 18 of which rotation decreases and stops due to the brake force P3 to rotate the carriers 21, 23 in a direction H, and the output shaft 24 integrally formed with the second carrier 23 rotates in a direction opposite to that of the input shaft 11.

Reviewing the direction of each gear in this state, the input differential gear 31A rotates in the direction B opposite to the rotational direction A of the input sun gear 12, the reverse rotation differential gear 32A integrally formed with the input differential gear 31A, rotates in the direction B and the output shaft 24 integrally formed with the first and second carriers 21, 23 rotates in the direction H opposite to that of the input shaft. The input and reverse rotation differential gears rotate about their own axis and at the same time rotate together with the first and second carriers 21, 23.

Below is a description of another embodiment of the present invention.

In the continuous automatic transmission 100 of the present invention, the medium speed control shaft 13, the medium speed sun gear 14, the bearings 14B, 14B' and the medium speed brake means 42 of the first embodiment are not required, and the construction of other parts is similar to that of the first embodiment.

Figure 8:
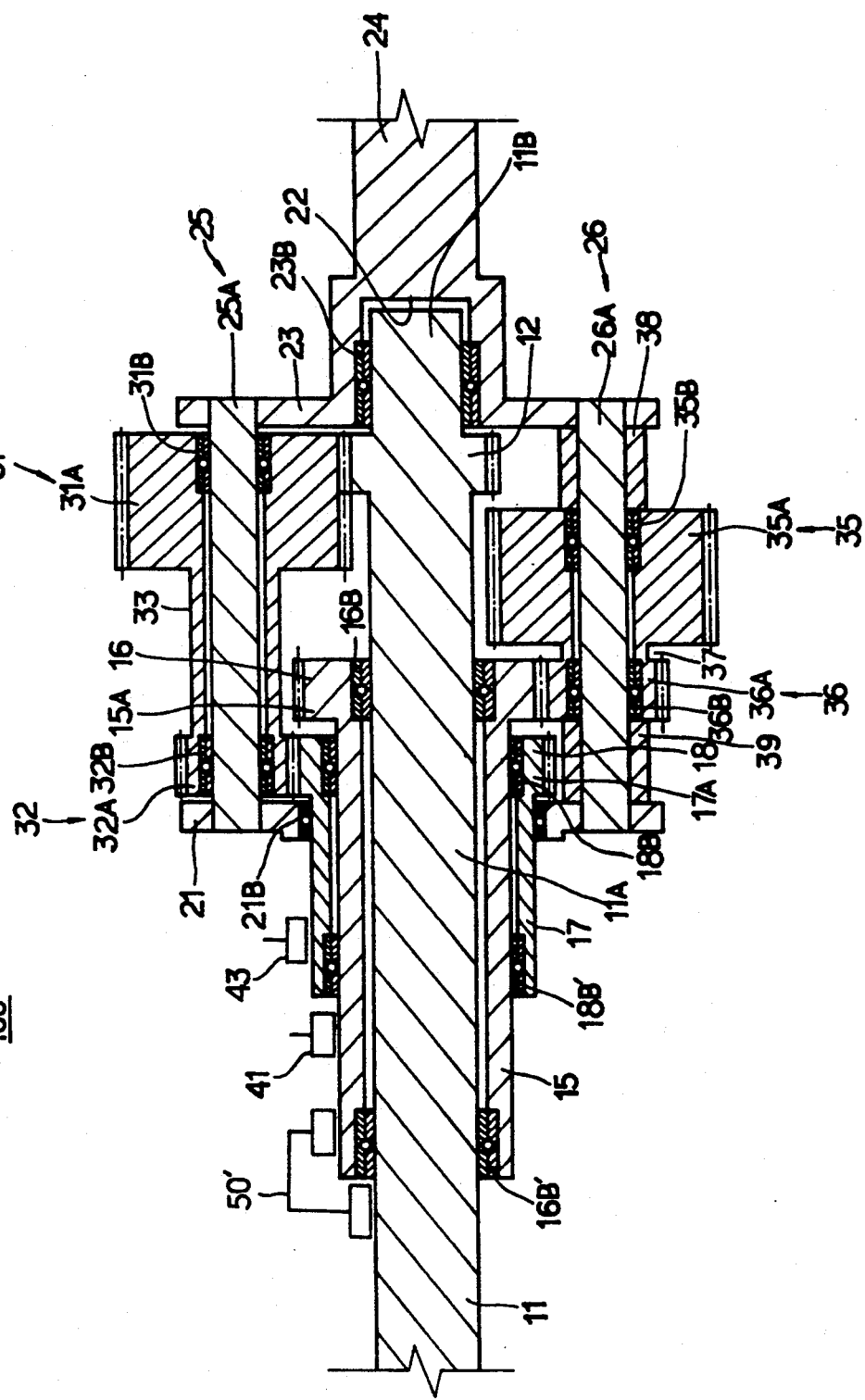
FIGS. 8-12 illustrate another embodiment of the continuous automatic transmission of the present invention.

In FIG. 8, the low speed differential gear 36A meshes with the low speed sun gear 16, the reverse rotation differential gear 32A meshes with the reverse rotation sun gear 18. The low speed brake means 41 for applying the brake force is installed on the low speed control shaft 15, and the reverse rotation brake means 43 for applying the brake force is installed on the reverse rotation control shaft 17.

In another embodiment, the low speed brake means 41 is operated for a forward low speed driving. In order to increase the speed, that is, in order to attain the medium and high speed driving, the interlocking means 50' can be employed which enables rotational differential between the input shaft 11 and the low speed control shaft 15 or which can rotate them integrally, and such means utilizes a system in which a hydraulic clutch, torque converter, electric electronic clutch, etc. is applied or combined. The reverse rotation brake means 43 is operated for the reverse driving.

The power transmission procedure and the principle of the speed variation of another embodiment of the continuous automatic transmission of the present invention constructed as such are similar to that of the first embodiment and will be briefly described below.

1. Neutral state (FIG. 9)

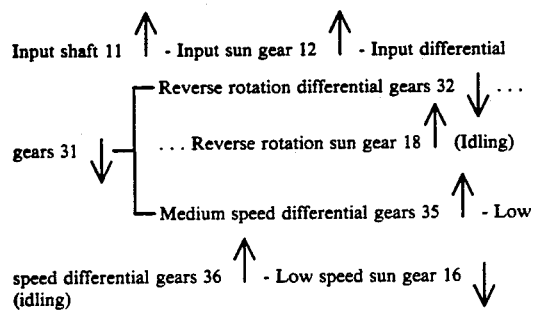

Figure 9:
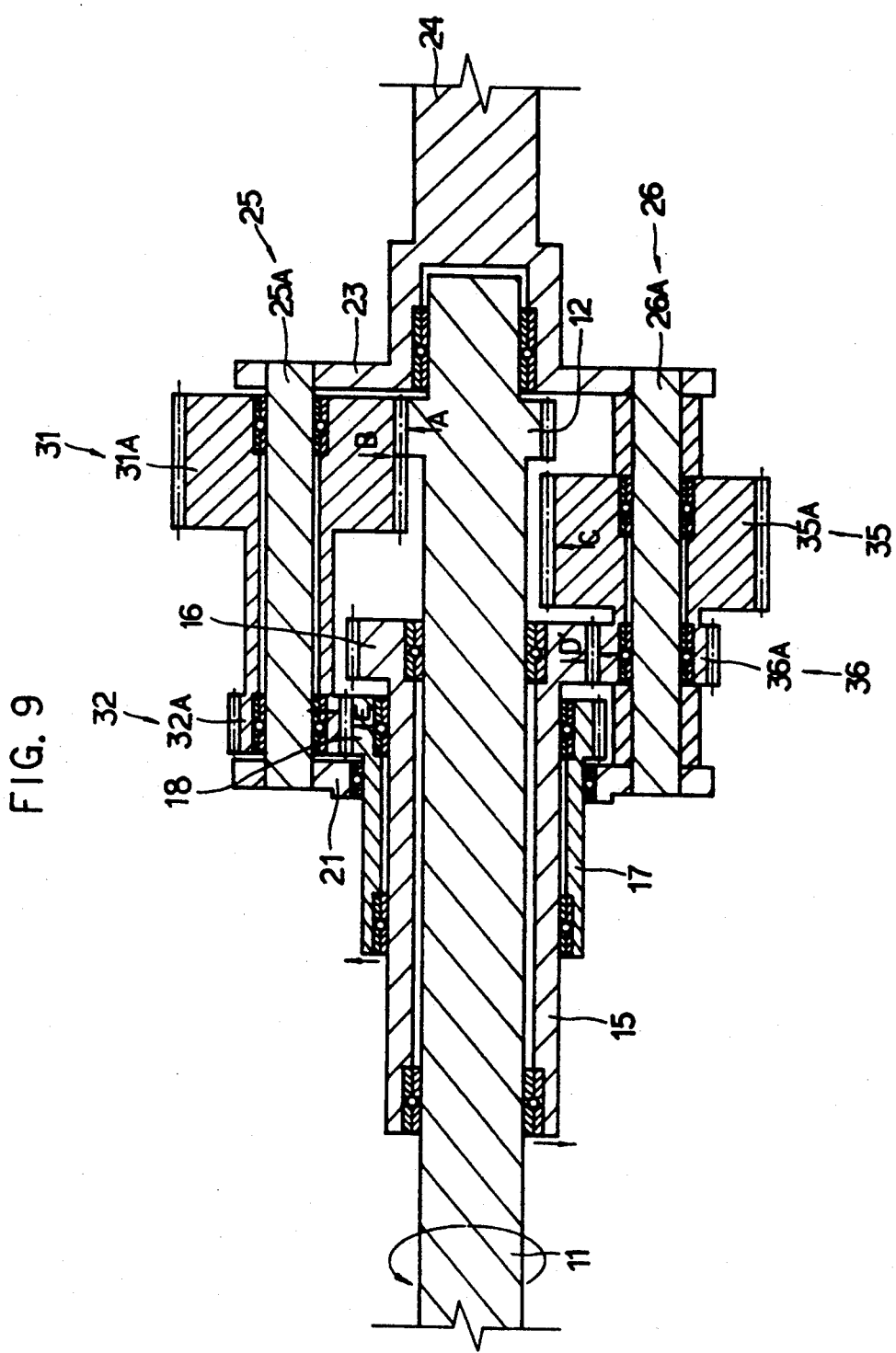

The neutral state is a state in which the driving force of the engine is not output to the output shaft 24 and the transmission idles as shown in FIG. 9. All the operation and construction are same as those of the first embodiment, except that the medium speed sun gear 14 and the medium speed control shaft 13 idles in the neutral state of the first embodiment and therefore description thereof is omitted.

Figure 10:
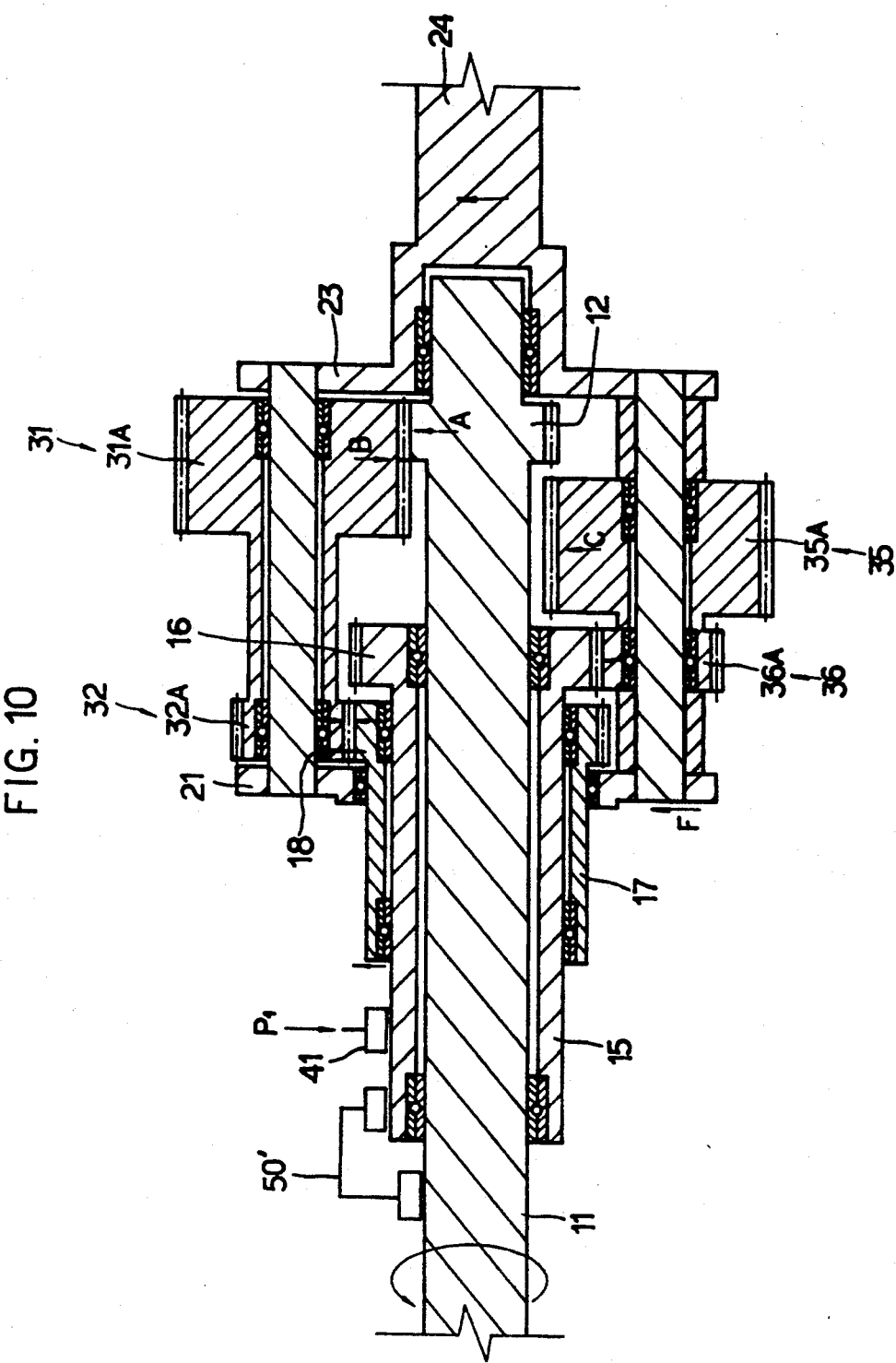

2. Forward low speed state (FIG. 10)

Input shaft 11 ↑ —Input sun gear 12 ↑ —Input differential gears 31 ↓ —Medium speed differential gears 35 ↑ —Low speed differential gears 36 ↑ —Carriers 21, 23 ↑ —Output shaft 24 ↑

The forward low speed state is a state in which the rotation of the output shaft 24 is gradually increased. Because this state is similar to the low speed state of FIG. 4 in the first embodiment, the description thereof will be made briefly.

If a brake force P1 is applied by the low speed brake means 41 installed on the low speed control shaft 15, the rotating in the direction D' opposite to that of input shaft 11, deceases and stops, and the rotation of the output shaft 24 increases gradually in proportion to the decreasing of rotation of the low speed sun gear 16.

In order to further increase the rotation of the output shaft 24 over the low speed state, the interlocking means 50' is used which enables rotational difference between the input shaft 11 and the low speed control shaft 15 or which can rotate them integrally. The low speed control shaft 15 which is stationary in the low speed state rotates in same direction as that of the input shaft by this interlocking means, and at this time the rotation of the output shaft 24 increases in proportion to the rotational speed of the low speed control shaft 15 which rotates in the direction of input shaft 11. That is, as the low speed sun gear 16 rotates in the direction of the input shaft, the co-rotation of the input and low speed differential gears 31, 36 together with the carriers 21, 23 increases gradually.

Figure 11:
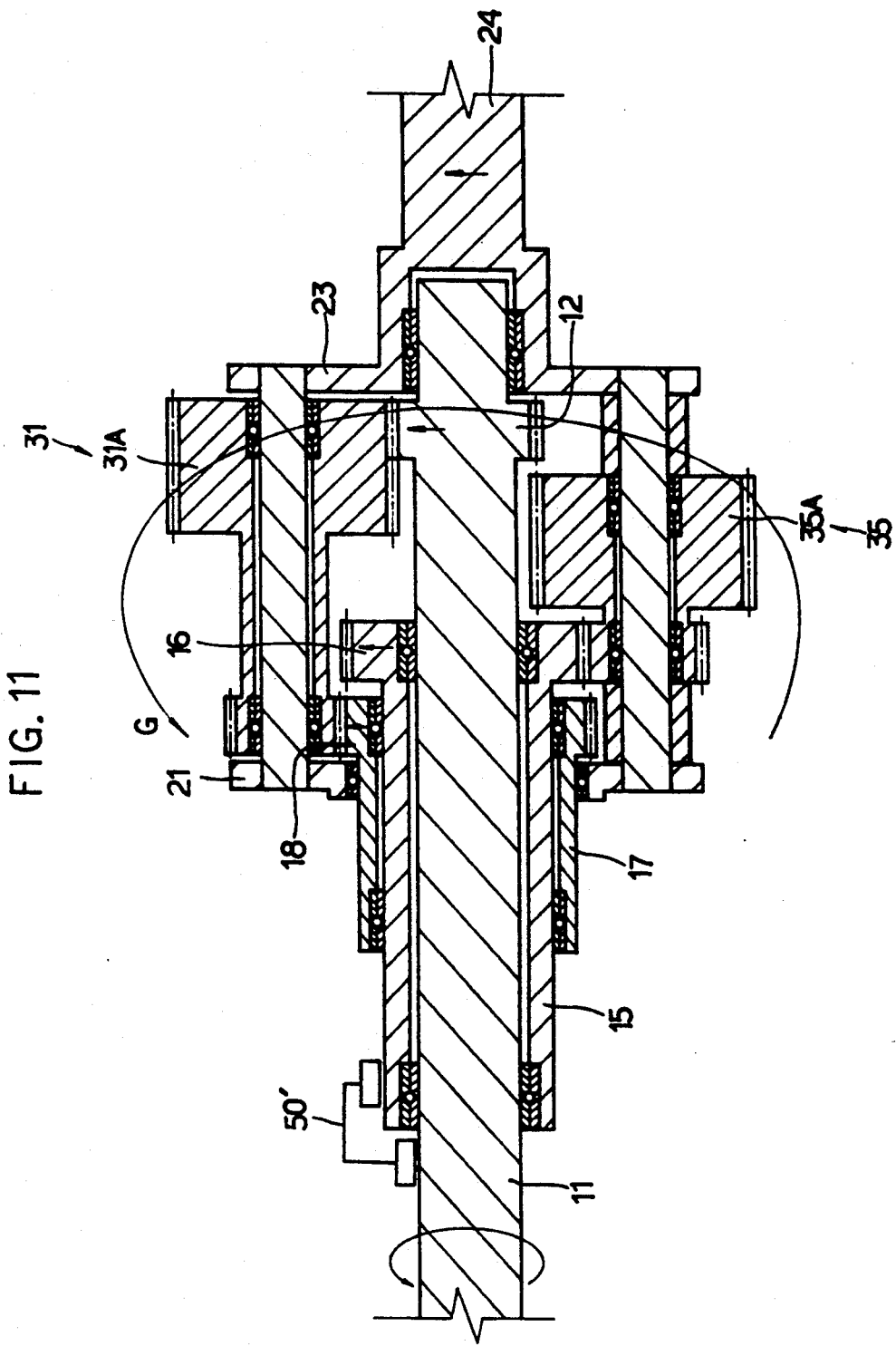

3. High speed state (FIG. 11)

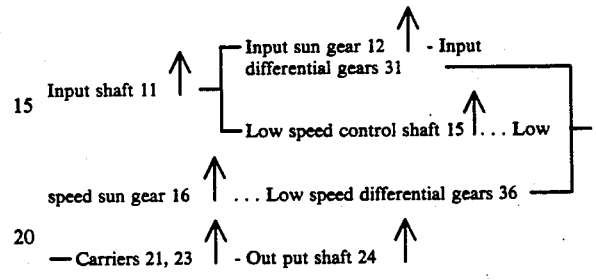

Because this state is similar to the high speed state of FIG. 6 in the first embodiment, the description about this is omitted.

Figure 12:
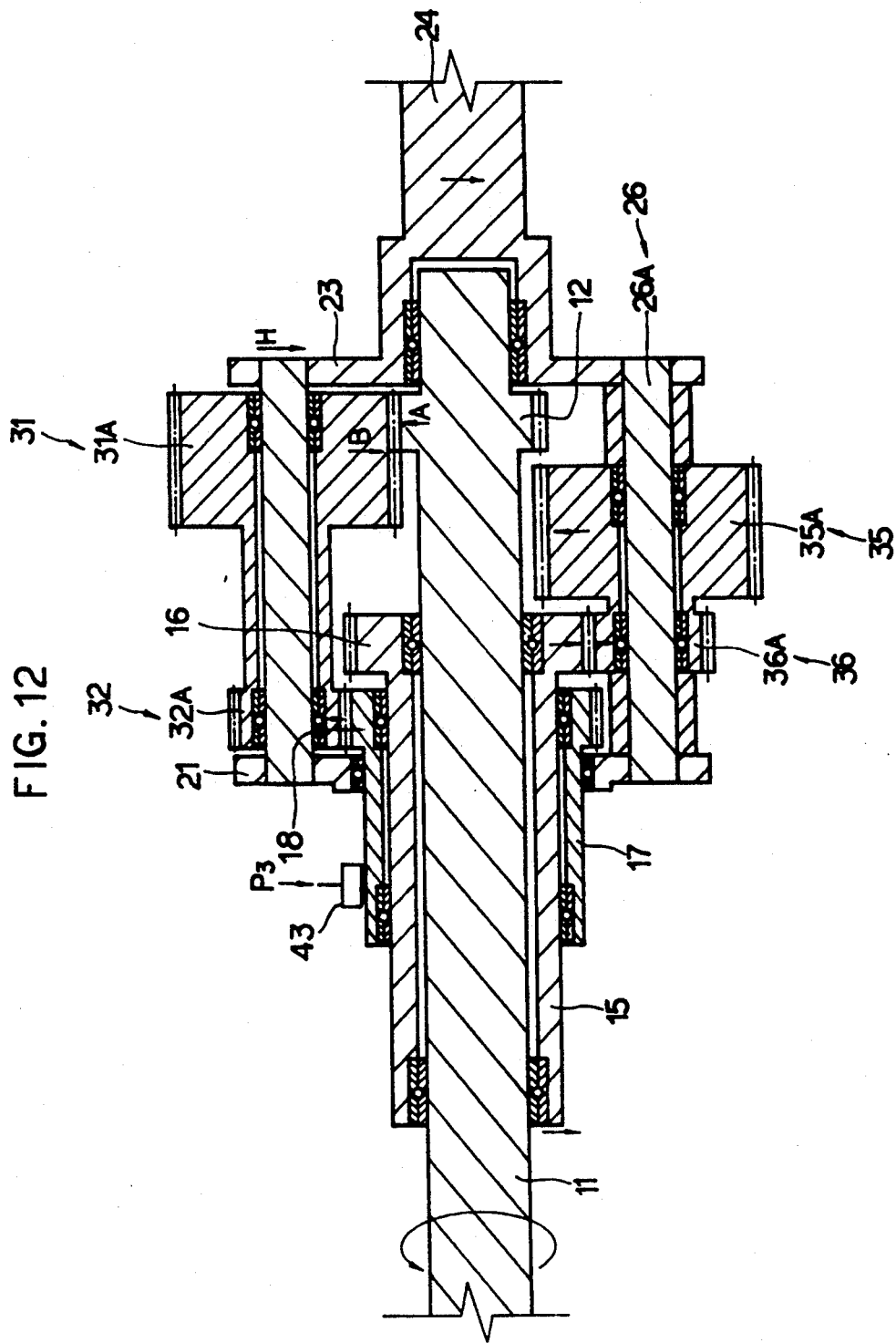

4. Reverse driving state (FIG. 12)

Input shaft 11 ↑ —Input sun gear 12 ↑ —Input differential gears 31 ↓ —Reverse rotation differential gears 32 ↓ —Carriers 21, 23 ↓ —Output shaft 24 ↓ (Opposite to the direction of the input shaft)

In the reverse driving state, the reverse rotation sun gear 18 stops by using the reverse rotation brake means 43 installed on the reverse rotation control shaft 17. Because this state is similar to the reverse driving state of FIG. 7 in the first embodiment, the description about this is omitted.

On the one hand, a required output revolutions can be obtained by properly adjusting the number of teeth on each gear according to a desired purpose.

Table 1 presents the number of teeth of each gear as examples, and Table 2 presents the revolutions of the output shaft (per 1 revolution of the input shaft) according to Table 1.

TABLE 1

|   | Input sun gear (12) | Input differential gear (31) | Reverse rotation differential gear (32) | Medium speed differential gear (35) | Low speed differential gear (36) | Low speed sun gear (16) | Medium speed sun gear (14) | Reverse rotation sun gear (18) |
|---|---|---|---|---|---|---|---|---|
| 1 | 21 | 33 | 18 | 33 | 22 | 32 | 21 | 45 |
| 2 | 24 | 38 | 18 | 34 | 22 | 40 | 28 | 44 |
| 3 | 24 | 36 | 18 | 24 | 18 | 42 | 36 | 42 |

TABLE 2

|   | Low speed sun gear (16) stops | Medium speed sun gear (14) stops | Reverse rotation sun gear (18) stops |
|---|---|---|---|
| 1 | 7/23 (0.304) | 1/2 (0.5) | −14/41 (−0.341) |
| 2 | 33/118 (0.279) | 6/13 (0.461) | −54/155 (−0.348) |
| 3 | 3/10 (0.3) | 2/5 (0.4) | −4/10 (−0.4) |

Mark "−" means the direction opposite to the input shaft

As described above, the continuous automatic transmission has advantages in that there is no need to install a clutch to cut the power of the engine when it is transmitted through the input shaft and output to the output shaft, that the satisfactory speed adjustment is possible through the adjustment of the speed variation ratio without change or disengagement of the gears, that especially the reverse driving is possible, that the production cost is saved due to simple structure and the smaller number of parts, and that the transmission can be installed in small space and operated without impact.

The continuous automatic transmission of the present invention is not limited to the present embodiment, but can be applied to any device which transmits and outputs the driving force to an output shaft in all vehicles and industrial machines based on the principle of the present invention, and it is obvious that various modifications and alterations can be made within the scope of the present invention.

Figure 13:
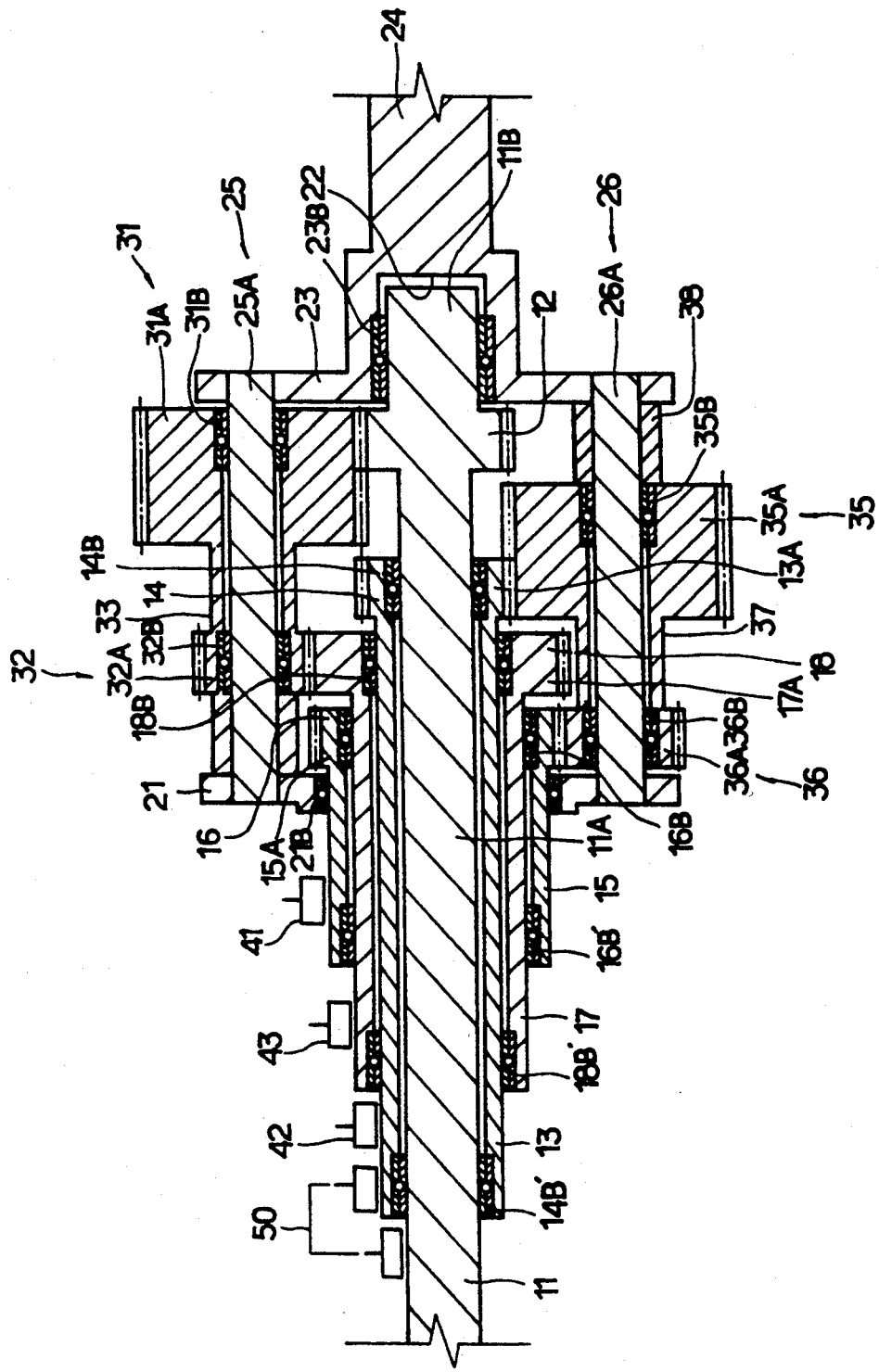
FIG. 13 is an assembled sectional view of another embodiment in which the low speed control shaft and the reverse rotation control shaft of FIG. 2 are interchanged.
Figure 14:
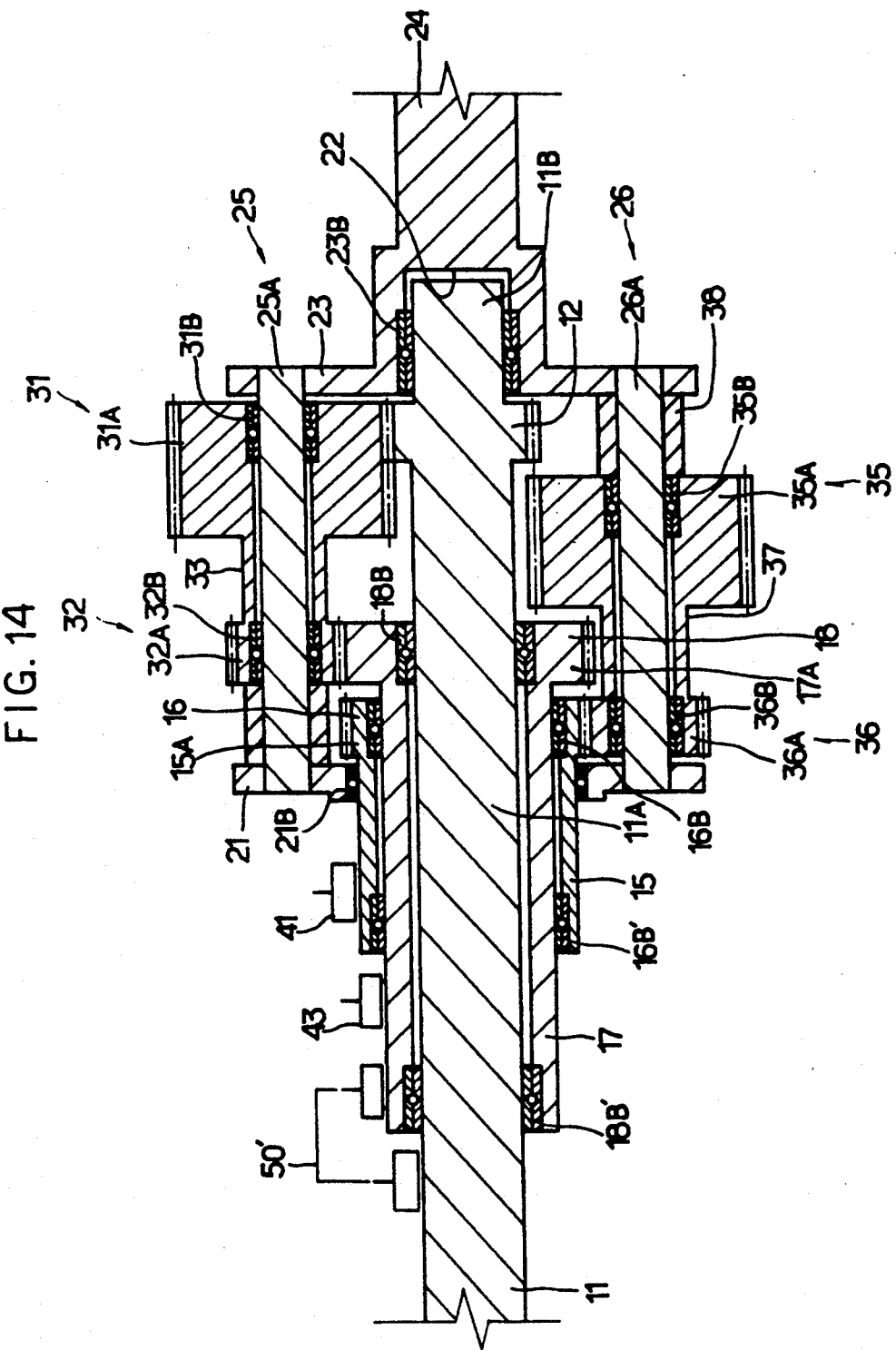
FIG. 14 is an assembled sectional view of another embodiment in which the low speed control shaft and the reverse rotation control shaft of FIG. 8 are interchanged.

For example, the low speed control shaft and the reverse rotation control shaft can be interchanged with each other. (See FIG. 13 and FIG. 14)

In the first embodiment, the medium speed control shaft, is rotatably positioned on the input shaft, the low speed control shaft is rotatably positioned on the medium speed control shaft 15 and the reverse rotation control shaft is positioned on the medium speed control shaft 15.

In another embodiment, the reverse rotation control shaft 17 is positioned on the medium speed control shaft which is rotatably mounted on the input shaft 11 and the low speed control shaft 15 is rotatably positioned on the reverse rotation control shaft.

As appreciated by those skilled in the art, the size of each gear associated with the low speed and the reverse rotation control shafts must be changed. That is, the reverse rotation differential gear 32A is able to mesh with the reverse rotation sun gear 18 by moving the input differential gear 31A closer to the reverse rotation differential 32A gear. Also, the low speed differential gear 36A is able to mesh with the low speed sun gear 16 by moving the medium speed 35A and low speed differential gears 36A further apart.

The present invention has been described in language more or less specific as to structural features in accordance with the relevant laws. It is understood that the invention so described is not to be limited to the specific features since the means and construction herein disclosed comprise a preferred form of effecting the invention. Thus, it will be appreciated by those skilled in the art that the present disclosure of the preferred form has been made only by way of example and that numerous changes in the details of the construction, combination and arrangement of parts may be resorted to without departing from the spirit and scope of the invention as appropriately interpreted by equivalents in the art.

What is claimed is:

1. An automatic variable speed transmission, comprising:

an input shaft (11) with a first section (11A) and a second section (11B) for receiving rotational input;

an input sun gear (12) integrally formed between said first section (11A) and said second section (11B) of said input shaft to enable simultaneous rotation with said input shaft;

a medium speed control shaft (13) having a medium speed sun gear (14) integrally formed thereon and being rotatably and coaxially mounted on said first section (11A) of said input shaft to enable independent rotation about said input shaft;

a low speed control shaft (15) having a low speed sun gear (16) integrally formed thereon and being rotatably and coaxially mounted on said medium speed control shaft (13) to enable independent rotation about said medium speed control shaft;

a reverse rotation control shaft (17) having a reverse rotation sun gear (18) integrally formed thereon and being rotatably and coaxially mounted on said low speed control shaft (15) to enable independent rotation about said low speed control shaft;

a first carrier (21) coaxially mounted on said reverse rotation control shaft (17) to enable independent rotation about said reverse rotation control shaft;

a second carrier (23) having a cavity (22) formed therein to coaxially receive therein said second section (11B) of said input shaft to enable independent rotation of said second carrier (23) about said second section of said input shaft and with said second carrier (23) terminating in an output shaft (24);

a plurality of locking pins (25), (26) secured to and interlinking said carriers (21), (23) to enable simultaneous rotation of said carriers (21), (23);

a plurality of input differential gears (31) with each said input differential gear (31A) being rotatably mounted on each said locking pin (25A) and with the inner side of the rear half of each said input differential gear being meshed with said input sun gear (12);

a plurality of reverse rotation differential gears (32) with each said reverse rotation differential gear (32A) being integrally formed with each said input differential gear (31A) and being rotatably mounted on each said locking pin (25A) and with the inner side of each said reverse rotation differential gear being meshed with said reverse rotation sun gear (18);

a plurality of medium speed differential gears (35) with each said medium speed differential gear (35A) being rotatably mounted on each said locking pin (26A) and with the rear half and the inner side of the forward half of each said medium speed differential gear (35A) being meshed with the forward half of each said input differential gear (31A) and said medium speed sun gear (14), respectively;

a plurality of low speed differential gears (36) with each said low speed differential gear (36A) being integrally formed with each said medium speed differential gear (35A) and being rotatably mounted on each said locking pin (26A) and with the inner side of each said low speed differential gear (36A) being meshed with said low speed sun gear (16);

a low speed brake means (41) for applying a braking force to said low speed control shaft (15) to provide a low sped driving;

a medium speed brake means (42) for applying a braking force to said medium speed control shaft (13) to provide a medium speed driving;

an interlocking means (50) for directly coupling the rotation of said input shaft (11) to said medium speed control shaft (13) so that they rotate simultaneously to provide high speed driving; and a reverse rotation brake means (43) for applying a braking force to said reverse rotation control shaft (17) to provide a reverse driving.

2. The automatic variable speed transmission of claim 1, wherein a sleeve (33), (37) is formed between said input and reverse rotation differential gears (31A), (32A) and between said medium and low speed differential gears (35A), (36A), respectively.

3. The automatic variable speed transmission of claim 1, wherein said reverse rotation control shaft (17) and said low speed control shaft (15) can be interchanged.

4. The automatic variable speed transmission of claim 1, wherein bushings (38), (39) are mounted on each locking pin (26A) to prevent the axial movement of each said medium speed and low speed differential gear (35A), (36A).

5. An automatic variable speed transmission, comprising:
   an input shaft (11) with a first section (11A) and a second section (11B) for receiving rotational input;
   an input sun gear (12) integrally formed between said first section (11A) and said second section (11B) of said input shaft to enable simultaneous rotation with said input shaft;
   a low speed control shaft (15) having a low speed sun gear (16) integrally formed thereon and being rotatably and coaxially mounted on said first section (11A) of said input shaft (11) to enable independent rotation about said input shaft;
   a reverse rotation control shaft (17) having a reverse rotation sun gear (18) integrally formed thereon and being rotatably and coaxially mounted on said low speed control shaft (15) to enable independent rotation about said low speed control shaft;
   a first carrier (21) coaxially mounted on said reverse rotation control shaft (17) near said reverse rotation sun gear (18) to enable independent rotation about said reverse rotation control shaft;
   a second carrier (23) having a cavity (22) formed therein to coaxially receive therein said second section (11B) of said input shaft to enable independent rotation about said second section of said input shaft and said second carrier (23) terminating in an output shaft (24);
   a plurality of locking pins (25), (26) secured to and interlinking said carriers (21), (23) to enable simultaneous rotation of said carriers (21), (23);
   a plurality of input differential gears (31) with each said input differential gear (31A) being rotatably mounted on each said locking pin (25A) and with the inner side of the rear half of each said input differential gear being meshed with said input sun gear (12);
   a plurality of reverse rotation differential gears (32) with each said reverse rotation differential gear (32A) being integrally formed with each said input differential gear (31A) and being rotatably mounted on each said locking pin (25A) and with the inner side of each said reverse rotation differential gear being meshed with said reverse rotation sun gear (18);
   a plurality of medium speed differential gears (35) with each said medium speed differential gear (35A) being rotatably mounted on each said locking pin (26A) and with the rear half of each said medium speed differential gear (35A) being meshed with the forward half of each said input differential gear (31A);
   a plurality of low speed differential gears (36) with each said low speed differential gear (36A) being integrally formed with each said medium speed differential gear (35A) and being rotatably mounted on each said locking pin (26A) and with the inner side of each said low speed differential gear (36A) being meshed with said low speed sun gear (16);
   a low speed brake means (41) for applying a braking force to said low speed control shaft (15) to rotate said output shaft at a low rotational speed;
   an interlocking means (50) for directly coupling the rotation of said input shaft (11) to said low speed control shaft (15) so that they have a difference in rotation between them or they rotate simultaneously to provide a medium and a high speed driving; and
   a reverse rotation brake means (43) for applying a braking force to said reverse rotation control shaft (17) to rotate said output shaft in a direction of rotation opposite to the rotation of said input shaft.

6. The automatic variable speed transmission of claim 5, wherein each sleeve (33), (37) is formed between said input and reverse rotation differential gears (31A), (32A) and between said medium and low speed differential gears (35A), (36A), respectively.

7. The automatic variable speed transmission of claim 5, wherein said reverse rotation control shaft (17) and said low speed control shaft (15) can be interchanged.

8. The automatic variable speed transmission of claim 5, wherein bushings (38), (39) are mounted on each locking pin (26A) to prevent the axial movement of each said medium speed and low speed differential gears (35A), (36A).

9. An automatic variable speed transmission, comprising:
   an input shaft (11) with a first section (11A) and a second section (11B) for receiving rotational input and further including an input sun gear (12) secured to said input shaft to enable simultaneous rotation with said input shaft;
   a medium speed control shaft (13) rotatably and coaxially mounted on said input shaft (11) to enable independent rotation about said input shaft and further including a medium speed sun gear (14) secured to said medium speed control shaft (13) to enable simultaneous rotation with said medium speed control shaft (13);
   a low speed control shaft (15) rotatably and coaxially mounted relative to said medium speed control shaft (13) to enable independent rotation about said medium speed control shaft (13) and said low speed shaft (15) further including a low speed sun gear (16) secured to said low speed control shaft (15) to enable simultaneous rotation with said low speed control shaft (15);
   a reverse rotation control shaft (17) rotatably and coaxially mounted relative to said medium speed control shaft (13) to enable independent rotation about said medium speed control shaft (13) and said reverse rotation control shaft (17) further including a reverse rotation sun gear (18) secured to said reverse rotation control shaft (17) to enable simultaneous rotation with said reverse rotation control shaft (17);
   a first carrier (21) rotatably and coaxially mounted on one of said reverse rotation control shaft (17) or said low speed control shaft (15) to enable independent rotation about one of said reverse rotation control shaft (17) or said low speed control shaft (15), respectively;
   a second carrier (23) rotatably and coaxially mounted on said second section (11B) of said input shaft (11) to enable independent rotation about said input shaft (11) and with said second carrier (23) terminating in an output shaft (24);

a plurality of locking pins (25), (26) with each locking pin of said plurality of locking pins (25), (26) secured to and interconnecting said first and second carriers (21), (23) to enable simultaneous rotation of said first carrier (21) about one of said reverse rotation control shaft (17) or said low speed control shaft (15), respectively, and said second carrier (23) about said input shaft (11);

a plurality of input differential gears (31) with each input differential gear (31A) of said plurality of input differential gears (31) in mechanical communication with said input sun gear (12);

a plurality of reverse rotation differential gears (32) with each said reverse rotation differential gear (32A) interconnected to an input differential gear (31A) of said plurality of input differential gears (31) and with said interconnected reverse rotation differential gear (32A) and said input differential gear (31A) rotatably mounted on a locking pin (25A) of said plurality of locking pins (25) to enable simultaneous rotation about said locking pin (25A) and each said reverse rotation differential gear (32A) in mechanical communication with said reverse rotation sun gear (18);

a plurality of medium speed differential gears (35) with each said medium speed differential gear (35A) in mechanical communication with said input differential gear (31A) and said medium speed sun gear (14);

a plurality of low speed differential gears (36) with each said low speed differential gear (36A) rotatably mounted on a locking pin (26A) and with each said low speed differential gear (36A) and said medium speed differential gear (35A) being interconnected to enable simultaneous rotation about said locking pin (26A) and each said low speed differential gear being in mechanical communication with said low speed sun gear (16);

a low speed brake means (41) for applying rotational braking force to said low speed control shaft (15) to provide a low speed rotation of said output shaft;

a medium speed brake means (42) for applying rotational braking force to said medium speed control shaft (13) to provide a medium speed rotation of said output shaft;

an interlocking means (50) for directly coupling the rotation of said input shaft (11) and the rotation of said medium speed control shaft (13) to provide high speed rotation of said output shaft; and a reverse rotation brake means (43) for applying rotational braking force to said reverse rotation control shaft (17) to provide reverse rotation of said output shaft.

10. The automatic variable speed transmission of claim 9 wherein said low speed control shaft (15) is rotatably and coaxially mounted on said medium speed control shaft (13) to enable independent rotation about said medium speed control shaft;

said reverse rotation control shaft (17) is rotatably and coaxially mounted on said low speed control shaft (15) to enable independent rotation about said low speed control shaft; and said first carrier (21) is rotatably and coaxially mounted on said reverse rotation control shaft (17) to enable independent rotation about said reverse rotation control shaft (17).

11. The automatic variable speed transmission of claim 9 wherein said reverse rotation control shaft (17) is rotatably and coaxially mounted on said medium speed control shaft (13) to enable independent rotation about said medium speed control shaft;

said low speed control shaft (15) is rotatably and coaxially mounted on said reverse rotation control shaft (17) to enable independent rotation about said reverse rotation control shaft; and said first carrier (21) is rotatably and coaxially mounted on said low speed control shaft (15) to enable independent rotation about said low speed control shaft (15).

12. An automatic variable speed transmission, comprising:

an input shaft (11) with a first section (11A) and a second section (11B) for receiving rotational input and further including an input sun gear (12) secured to said input shaft to enable simultaneous rotation with said input shaft;

a low speed control shaft (15) rotatably and coaxially mounted relative to said input shaft (11) to enable independent rotation about said input shaft (11) and said shaft (15) further including a low speed sun gear (16) secured to said low speed control shaft (15) to enable simultaneous rotation with said low speed control shaft (15);

a reverse rotation control shaft (17) rotatably and coaxially mounted relative to said input shaft (11) to enable independent rotation about said input shaft (11) and said shaft (17) further including a reverse rotation sun gear (18) secured to said reverse rotation control shaft (17) to enable simultaneous rotation with said reverse rotation control shaft (17);

a first carrier (21) rotatably and coaxially mounted on one of said reverse rotation control shaft (17) or said low speed control shaft (15) to enable independent rotation about one of said reverse rotation control shaft (17) or said low speed control shaft (15), respectively;

a second carrier (23) rotatably and coaxially mounted on said second section (11B) of said input shaft (11) to enable independent rotation about said input shaft (11) and with said second carrier (23) terminating in an output shaft (24);

a plurality of locking pins (25), (26) with each locking pin of said plurality of locking pins (25), (26) secured to and interconnecting said first and second carriers (21), (23) to enable simultaneous rotation of said first carrier (21) about one of said reverse rotation control shaft (17) or said low speed control shaft (15), respectively, and said second carrier (23) about said input shaft (11);

a plurality of input differential gears (31) with each input differential gear (31A) of said plurality of input differential gears (31) in mechanical communication with said input sun gear (12);

a plurality of reverse rotation differential gears (32) with each said reverse rotation differential gear (32A) interconnected to an input differential gear (31A) of said plurality of input differential gears (31) and with said interconnected reverse rotation differential gear (32A) and said input differential gear (31A) rotatably mounted on a locking pin (25A) of said plurality of locking pins (25) to enable simultaneous rotation about said locking pin (25A) and each said reverse rotation differential gear (32A) in mechanical communication with said reverse rotation sun gear (18);

a plurality of medium speed differential gears (35) with each said medium speed differential gear (35A) in mechanical communication with said input differential gear (31A);

a plurality of low speed differential gears (36) with each said low speed differential gear (36A) rotatably mounted on a locking pin (26A) and with each said low speed differential gear (36A) and said medium speed differential gear (35A) being interconnected to enable simultaneous rotation about said locking pin (26A) and each said low speed differential gear being in mechanical communication with said low speed sun gear (16);

a low speed brake means (41) for applying rotational braking force to said low speed control shaft (15) to provide a low speed rotation of said output shaft;

an interlocking means (50) for directly coupling the rotation of said input shaft (11) and the rotation of one of said low speed control shaft (15) or said reverse rotation control shaft (17) to provide medium and high speed rotation of said output shaft; and a reverse rotation brake means (43) for applying rotation braking force to said reverse rotation control shaft (17) to provide reverse rotation of said output shaft.

13. The automatic variable speed transmission of claim 12 wherein said low speed control shaft (15) is rotatably and coaxially mounted on said input speed control shaft (11) to enable independent rotation about said input shaft;

said reverse rotation control shaft (17) is rotatably and coaxially mounted on said low speed control shaft (15) to enable independent rotation about said low speed control shaft; and said first carrier (21) is rotatably and coaxially mounted on said reverse rotation control shaft (17) to enable independent rotation about said reverse rotation control shaft (17).

14. The automatic variable speed transmission of claim 12 wherein said reverse rotation control shaft (17) is rotatably and coaxially mounted on said input shaft (11) to enable independent rotation about said input shaft; and said low speed control shaft (15) is rotatably and coaxially mounted on said reverse rotation control shaft (17) to enable independent rotation about said reverse rotation control shaft; and said first carrier (21) is rotatably and coaxially mounted on said low speed control shaft (15) to enable independent rotation about said low speed control shaft (15).

* * * * *

UNITED STATES PATENT AND TRADEMARK OFFICE
CERTIFICATE OF CORRECTION

PATENT NO. : 5,322,488

DATED : June 21, 1994

INVENTOR(S) : Ra et al.

It is certified that error appears in the above-identified patent and that said Letters Patent is hereby corrected as shown below:

Title page, Item

[75], Inventors "Yangsan-Gu" should read --Yongsan-Gu--

[75], Inventors "Incheon," should read --Incheon-City,--

[57], Abstract, line 5 "rotatable" should read --rotatably--

[57], Abstract, line 6 "rotatable" should read --rotatably--

[57], Abstract, line 7 "rotatable" should read --rotatably--

[57], Abstract, line 12 "rotatable" should read --rotatably--

[57], Abstract, line 16 "rotatable" should read --rotatably--

Col. 3, line 53 "1" should read --15--

Col. 4, line 18 "and each the" should read --and with each--

Col. 4, line 19 insert --being-- after the word "32A"

Col. 5, line 58 insert --a-- after the word "of"

Col. 5, line 65 insert --a-- after the word "of"

Col. 6, line 27 insert --with-- after the word "formed"

Col. 8, line 37 insert --the-- after the word "of"

UNITED STATES PATENT AND TRADEMARK OFFICE
CERTIFICATE OF CORRECTION

PATENT NO. : 5,322,488

DATED : June 21, 1994

INVENTOR(S) : Ra et al.

It is certified that error appears in the above-identified patent and that said Letters Patent is hereby corrected as shown below:

Col. 8, line 47 "natural" should read --neutral--

Col. 11, line 57 insert --rotational speed of the low speed sun gear 16 which was-- after the word "the"

Col. 11, line 68 insert --the-- after the word "in"

Col. 14, line 53 "sped" should read --speed--

Signed and Sealed this

Twenty-fourth Day of December, 1996

*Attest:*

BRUCE LEHMAN

*Attesting Officer*     *Commissioner of Patents and Trademarks*